US010536373B1

United States Patent
Bales et al.

(10) Patent No.: US 10,536,373 B1
(45) Date of Patent: *Jan. 14, 2020

(54) SESSION AGGREGATOR BROKERING OF DATA STREAM COMMUNICATION

(71) Applicant: Sprint Communications Company L.P., Overland Park, KS (US)

(72) Inventors: Mark R. Bales, Lee's Summit, MO (US); Lyle T. Bertz, Lee's Summit, MO (US); Lyle W. Paczkowski, Mission Hills, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,311

(22) Filed: Feb. 14, 2019

Related U.S. Application Data

(62) Division of application No. 15/284,506, filed on Oct. 3, 2016, now Pat. No. 10,250,498.

(51) Int. Cl.
*G06F 15/16* (2006.01)
*H04L 12/721* (2013.01)
(Continued)

(52) U.S. Cl.
CPC ............ *H04L 45/70* (2013.01); *H04L 43/087* (2013.01); *H04L 43/0852* (2013.01);
(Continued)

(58) Field of Classification Search
CPC ......... H04L 43/08; H04L 45/16; H04L 45/70; H04L 43/0852; H04L 43/087; H04L 43/0888; H04L 45/302; H04L 45/50
(Continued)

(56) References Cited

U.S. PATENT DOCUMENTS 5,928,363 A   7/1999  Ruvolo
5,983,350 A  11/1999  Minear et al.
(Continued)

FOREIGN PATENT DOCUMENTS

WO  2015039699 A1  3/2015
WO  2016102297 A1  6/2016
WO  2017062101 A1  4/2017

OTHER PUBLICATIONS

Notice of Allowance dated Oct. 5, 2016, U.S. Appl. No. 14/746,615, filed Jun. 22, 2015.
(Continued)

*Primary Examiner* — Liang Che A Wang
*Assistant Examiner* — Kaylee J Huang

(57) ABSTRACT

A system for proving secure streamed data sessions is disclosed. The system comprises a first computer system executing an orchestrator virtualized network function (VNF). The orchestrator VNF collects performance metrics on routers, receives a request for a secure streamed data session, analyzes the metrics based on the request, determines a secure routing path, creates a routing instruction set that defines the secure routing path, and transmits the routing instruction set to a session aggregator. The system further comprises a second computer system that executes the session aggregator in a trusted security zone. The session aggregator establishes trusted end-to-end communication links with a first edge router, a second edge router, and at least one of the plurality of routers and configures the routing instruction set into each of the CPE node, the first edge router, the second edge router, and the at least one router via the trusted end-to-end communication link.

20 Claims, 7 Drawing Sheets

(51) Int. Cl.
*H04L 12/26* (2006.01)
*H04L 12/725* (2013.01)
*H04L 12/723* (2013.01)
*H04L 29/06* (2006.01)

(52) U.S. Cl.
CPC ........ *H04L 43/0888* (2013.01); *H04L 45/302* (2013.01); *H04L 45/50* (2013.01); *H04L 63/0272* (2013.01)

(58) Field of Classification Search
USPC .................................. 709/231, 230, 238, 239
See application file for complete search history.

(56) References Cited

U.S. PATENT DOCUMENTS

| | | |
|---|---|---|
| 6,775,772 B1 | 8/2004 | Binding et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes |
| 7,661,104 B2 | 2/2010 | Watt et al. |
| 7,702,951 B2 | 4/2010 | Yamamoto et al. |
| 7,849,296 B2 | 12/2010 | Watt et al. |
| 8,005,000 B1 | 8/2011 | Srinivasan |
| 8,090,797 B2 | 1/2012 | Chinta et al. |
| 8,171,483 B2 | 5/2012 | Nord et al. |
| 8,271,976 B2 | 9/2012 | Vega et al. |
| 8,280,944 B2 | 10/2012 | Laadan et al. |
| 8,443,230 B1 | 5/2013 | James-Roxby et al. |
| 8,649,770 B1 | 2/2014 | Cope et al. |
| 8,712,407 B1 | 4/2014 | Cope et al. |
| 8,797,875 B2 | 8/2014 | Garcia Martin et al. |
| 8,842,578 B1 | 9/2014 | Zisapel et al. |
| 8,863,252 B1 | 10/2014 | Katzer et al. |
| 8,918,860 B1 | 12/2014 | Enderwick |
| 8,935,318 B1 | 1/2015 | Konerding et al. |
| 8,984,110 B1 | 3/2015 | Asveren |
| 8,996,644 B2 | 3/2015 | Pope |
| 9,047,441 B2 | 6/2015 | Xie et al. |
| 9,077,709 B1 | 7/2015 | Dall et al. |
| 9,104,836 B2 | 8/2015 | Burstein et al. |
| 9,118,655 B1 | 8/2015 | Paczkowski et al. |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,203,842 B2 | 12/2015 | Venkataramu et al. |
| 9,230,085 B1 | 1/2016 | Paczkowski et al. |
| 9,237,084 B2 | 1/2016 | Chapman |
| 9,251,384 B1 | 2/2016 | Potlapally et al. |
| 9,274,974 B1 | 3/2016 | Chen et al. |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,317,689 B2 | 4/2016 | Aissi |
| 9,319,220 B2 | 4/2016 | Grewal et al. |
| 9,324,016 B1 | 4/2016 | Cordes et al. |
| 9,374,363 B1 | 6/2016 | Paczkowski et al. |
| 9,384,028 B1 | 7/2016 | Felstaine et al. |
| 9,392,446 B1 | 7/2016 | Paczkowski et al. |
| 9,396,016 B1 | 7/2016 | Marquardt et al. |
| 9,407,612 B2 | 8/2016 | Sood et al. |
| 9,413,634 B2 | 8/2016 | Nadeau et al. |
| 9,444,886 B2 | 9/2016 | Rahman et al. |
| 9,450,866 B2 | 9/2016 | He et al. |
| 9,460,286 B1 | 10/2016 | Felstaine et al. |
| 9,462,084 B2 | 10/2016 | Connor et al. |
| 9,503,344 B2 | 11/2016 | Chakrabarti et al. |
| 9,503,363 B2 | 11/2016 | Sivabalan et al. |
| 9,509,587 B1 | 11/2016 | Marquardt et al. |
| 9,519,563 B2 | 12/2016 | Manghirmalani et al. |
| 9,537,741 B2 | 1/2017 | Chakrabarti et al. |
| 9,549,321 B2 | 1/2017 | Slavov et al. |
| 9,560,078 B2 | 1/2017 | Sood et al. |
| 9,565,168 B1 | 2/2017 | Marquardt et al. |
| 9,578,008 B2 | 2/2017 | Sood et al. |
| 9,578,664 B1 | 2/2017 | Paczkowski et al. |
| 9,613,190 B2 | 4/2017 | Ford et al. |
| 9,628,445 B2 | 4/2017 | Antonakakis |
| 9,648,044 B2 | 5/2017 | Islam et al. |
| 9,667,665 B1 | 5/2017 | Paczkowski et al. |
| 9,686,237 B2 | 6/2017 | DeCusatis et al. |
| 9,686,240 B1 | 6/2017 | Ray et al. |
| 9,692,743 B2 | 6/2017 | Islam et al. |
| 9,729,515 B1 | 8/2017 | Anantharaju |
| 9,742,790 B2 | 8/2017 | Sood et al. |
| 9,749,294 B1 | 8/2017 | Marquardt et al. |
| 9,769,854 B1 | 9/2017 | Paczkowski et al. |
| 9,781,016 B1 | 10/2017 | Marquardt et al. |
| 9,811,686 B1 | 11/2017 | Marquardt et al. |
| 9,819,661 B2 | 11/2017 | Stern |
| 9,871,768 B1 | 1/2018 | Ray et al. |
| 9,979,699 B1 | 5/2018 | Marquardt et al. |
| 10,044,572 B1 | 8/2018 | Marquardt et al. |
| 10,250,498 B1 | 4/2019 | Bales et al. |
| 10,348,488 B1 | 7/2019 | Paczkowski et al. |
| 2002/0091650 A1 | 7/2002 | Ellis |
| 2002/0107958 A1 | 8/2002 | Faraldo |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0221163 A1 | 11/2004 | Jorgensen et al. |
| 2004/0240468 A1 | 12/2004 | Chin et al. |
| 2004/0260910 A1 | 12/2004 | Watt et al. |
| 2005/0068981 A1 | 3/2005 | Park et al. |
| 2005/0102603 A1 | 5/2005 | Tapper et al. |
| 2005/0114616 A1 | 5/2005 | Tune et al. |
| 2005/0124382 A1 | 6/2005 | Britt et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2005/0261985 A1 | 11/2005 | Miller et al. |
| 2006/0146767 A1 | 7/2006 | Moganti |
| 2006/0190614 A1 | 8/2006 | Altman et al. |
| 2006/0253701 A1 | 11/2006 | Kim et al. |
| 2006/0259641 A1 | 11/2006 | Kim et al. |
| 2007/0174253 A1 | 7/2007 | Hodnett et al. |
| 2007/0282572 A1 | 12/2007 | Larus |
| 2008/0020745 A1 | 1/2008 | Bae et al. |
| 2008/0049640 A1 | 2/2008 | Heinz et al. |
| 2008/0162877 A1 | 7/2008 | Altman et al. |
| 2008/0165259 A1 | 7/2008 | Nobels |
| 2008/0189468 A1 | 8/2008 | Schmidt et al. |
| 2008/0301779 A1 | 12/2008 | Garg et al. |
| 2009/0007100 A1 | 1/2009 | Field et al. |
| 2009/0199177 A1 | 8/2009 | Edwards et al. |
| 2009/0210526 A1 | 8/2009 | Howell et al. |
| 2009/0241108 A1 | 9/2009 | Edwards et al. |
| 2009/0254984 A1 | 10/2009 | Nice et al. |
| 2009/0300605 A1 | 12/2009 | Edwards et al. |
| 2009/0320048 A1 | 12/2009 | Watt et al. |
| 2010/0103837 A1 | 4/2010 | Jungck et al. |
| 2010/0106568 A1 | 4/2010 | Grimes |
| 2010/0192230 A1 | 7/2010 | Steeves et al. |
| 2010/0306361 A1 | 12/2010 | Boberg et al. |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0117379 A1 | 5/2012 | Thornewell et al. |
| 2012/0304244 A1 | 11/2012 | Xie et al. |
| 2012/0331550 A1 | 12/2012 | Raj et al. |
| 2013/0055256 A1 | 2/2013 | Banga et al. |
| 2013/0070745 A1 | 3/2013 | Nixon et al. |
| 2013/0091568 A1 | 4/2013 | Sharif et al. |
| 2013/0160139 A1 | 6/2013 | Goel et al. |
| 2013/0219010 A1 | 8/2013 | Mahendran et al. |
| 2013/0290563 A1 | 10/2013 | Fleischman et al. |
| 2013/0305333 A1 | 11/2013 | Katzer et al. |
| 2013/0333008 A1 | 12/2013 | Tapling et al. |
| 2013/0345530 A1* | 12/2013 | McRoberts .......... A61B 5/0022 600/323 |
| 2014/0013327 A1 | 1/2014 | Sherwood et al. |

(56) References Cited

U.S. PATENT DOCUMENTS

| | | |
|---|---|---|
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh et al. |
| 2014/0092753 A1* | 4/2014 | Vasseur .............. H04L 41/5009 370/248 |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2014/0259115 A1 | 9/2014 | Bakshi et al. |
| 2014/0281529 A1 | 9/2014 | Epp et al. |
| 2014/0281544 A1 | 9/2014 | Paczkowski et al. |
| 2014/0289826 A1 | 9/2014 | Croome |
| 2014/0298477 A1 | 10/2014 | Castro et al. |
| 2014/0304803 A1 | 10/2014 | Pope et al. |
| 2014/0325681 A1 | 10/2014 | Kleidermacher et al. |
| 2014/0331297 A1 | 11/2014 | Innes et al. |
| 2014/0337940 A1 | 11/2014 | Slavov et al. |
| 2014/0344912 A1 | 11/2014 | Chapman et al. |
| 2014/0373012 A1 | 12/2014 | Ylitalo et al. |
| 2015/0046676 A1 | 2/2015 | Archibald et al. |
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0169885 A1 | 6/2015 | Paczkowski et al. |
| 2015/0172928 A1 | 6/2015 | Katzer et al. |
| 2015/0180730 A1 | 6/2015 | Felstaine et al. |
| 2015/0195149 A1 | 7/2015 | Vasseur et al. |
| 2015/0195281 A1 | 7/2015 | Venkataramu et al. |
| 2015/0215308 A1 | 7/2015 | Manolov et al. |
| 2015/0220937 A1 | 8/2015 | Iannace et al. |
| 2015/0237035 A1 | 8/2015 | Islam et al. |
| 2015/0244717 A1 | 8/2015 | Jin et al. |
| 2015/0248283 A1 | 9/2015 | Gschwind et al. |
| 2015/0248554 A1 | 9/2015 | Dumitru et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0004876 A1 | 1/2016 | Bye et al. |
| 2016/0007190 A1 | 1/2016 | Wane |
| 2016/0043944 A1 | 2/2016 | Felstaine et al. |
| 2016/0057102 A1 | 2/2016 | Wei et al. |
| 2016/0057171 A1 | 2/2016 | DeCusatis et al. |
| 2016/0057788 A1 | 2/2016 | Sharma et al. |
| 2016/0073283 A1 | 3/2016 | Grayson et al. |
| 2016/0080323 A1 | 3/2016 | MacKay et al. |
| 2016/0086172 A1 | 3/2016 | Kamal |
| 2016/0094573 A1 | 3/2016 | Sood et al. |
| 2016/0119141 A1 | 4/2016 | Jing et al. |
| 2016/0119374 A1 | 4/2016 | Williams et al. |
| 2016/0127323 A1 | 5/2016 | Antonakakis |
| 2016/0127333 A1 | 5/2016 | Sood et al. |
| 2016/0142396 A1 | 5/2016 | McRoberts et al. |
| 2016/0149748 A1 | 5/2016 | Pan |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182499 A1 | 6/2016 | Sharaga et al. |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226907 A1 | 8/2016 | Weiss et al. |
| 2016/0226912 A1 | 8/2016 | Clark et al. |
| 2016/0226913 A1 | 8/2016 | Sood et al. |
| 2016/0234725 A1 | 8/2016 | Paczkowski et al. |
| 2016/0253664 A1 | 9/2016 | Yuan et al. |
| 2016/0323200 A1 | 11/2016 | Xiang et al. |
| 2016/0337329 A1 | 11/2016 | Sood et al. |
| 2016/0344560 A1 | 11/2016 | Caceres et al. |
| 2016/0350150 A1 | 12/2016 | Marquardt et al. |
| 2016/0352537 A1 | 12/2016 | Marquardt et al. |
| 2016/0366105 A1 | 12/2016 | Smith et al. |
| 2016/0366123 A1 | 12/2016 | Smith et al. |
| 2016/0373474 A1 | 12/2016 | Sood et al. |
| 2016/0378685 A1 | 12/2016 | Spurlock et al. |
| 2016/0379003 A1 | 12/2016 | Kapoor et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0034284 A1 | 2/2017 | Smith et al. |
| 2017/0068817 A1 | 3/2017 | Ali et al. |
| 2017/0093806 A1 | 3/2017 | Phegade et al. |
| 2017/0102957 A1 | 4/2017 | Marquardt et al. |
| 2017/0126413 A1 | 5/2017 | Grobman et al. |
| 2017/0142024 A1 | 5/2017 | Fromentoux et al. |
| 2017/0142163 A1 | 5/2017 | Sood et al. |
| 2017/0149798 A1 | 5/2017 | Antonakakis |
| 2017/0161501 A1 | 6/2017 | Sood et al. |
| 2017/0187723 A1 | 6/2017 | Islam et al. |
| 2017/0208038 A1 | 7/2017 | Hinaman et al. |
| 2017/0214694 A1 | 7/2017 | Yon |
| 2017/0230428 A1 | 8/2017 | Paczkowski et al. |
| 2017/0308872 A1 | 10/2017 | Uhr et al. |
| 2017/0310647 A1 | 10/2017 | Hu et al. |
| 2017/0347308 A1* | 11/2017 | Chou .................... H04L 45/121 |
| 2018/0082390 A1 | 3/2018 | Leidner et al. |
| 2018/0218342 A1 | 8/2018 | Lim et al. |
| 2019/0019188 A1 | 1/2019 | Leidner et al. |

OTHER PUBLICATIONS

Notice of Allowance dated May 12, 2017, U.S. Appl. No. 15/403,166, filed Jan. 10, 2017.

FAIPP Pre-Interview Communication dated Jul. 25, 2016, U.S. Appl. No. 14/703,885, filed May 5, 2015.

Notice of Allowance dated Sep. 20, 2016, U.S. Appl. No. 14/703,885, filed May 5, 2015.

FAIPP Pre-Interview Communication dated Feb. 7, 2017, U.S. Appl. No. 14/847,992, filed Sep. 8, 2015.

Notice of Allowance dated Apr. 25, 2017, U.S. Appl. No. 14/847,992, filed Sep. 8, 2015.

FAIPP Pre-Interview Communication dated Dec. 15, 2017, U.S. Appl. No. 15/655,080, filed Jul. 20, 2017.

Notice of Allowance dated Jan. 30, 2018, U.S. Appl. No. 15/655,080, filed Jul. 20, 2017.

FAIPP Pre-Interview Communication dated Mar. 9, 2017, U.S. Appl. No. 14/930,146, filed Nov. 2, 2015.

Notice of Allowance dated May 26, 2017, U.S. Appl. No. 14/930,146, filed Nov. 2, 2015.

FAIPP Pre-Interview Communication dated Jan. 12, 2018, U.S. Appl. No. 15/686,324, filed Aug. 25, 2017.

Notice of Allowance dated Apr. 16, 2018, U.S. Appl. No. 15/686,324, filed Aug. 25, 2017.

FAIPP Pre-Interview Communication dated Apr. 20, 2017, U.S. Appl. No. 14/879,324, filed Oct. 9, 2015.

Notice of Allowance dated Jul. 3, 2017, U.S. Appl. No. 14/879,324, filed Oct. 9, 2015.

FAIPP Pre-Interview Communication dated Oct. 19, 2017, U.S. Appl. No. 14/872,936, filed Oct. 1, 2015.

Final Office Action Apr. 17, 2018, U.S. Appl. No. 14/872,936, filed Oct. 1, 2015.

Office Action dated Oct. 30, 2018, U.S. Appl. No. 14/872,936, filed Oct. 1, 2015.

Final Office Action dated Apr. 19, 2019, U.S. Appl. No. 14/872,936, filed Oct. 1, 2015.

Office Action dated Jul. 24, 2017, U.S. Appl. No. 14/879,327, filed Oct. 9, 2015.

Final Office Action dated Feb. 7, 2018, U.S. Appl. No. 14/879,327, filed Oct. 9, 2015.

(56) References Cited

OTHER PUBLICATIONS

Notice of Allowance dated Nov. 21, 2016, U.S. Appl. No. 14/793,344, filed Jul. 7, 2015.
Notice of Allowance dated Sep. 11, 2017, U.S. Appl. No. 15/602,057, filed May 22, 2017.
FAIPP Pre-Interview Communication dated Oct. 9, 2018, U.S. Appl. No. 15/284,506, filed Oct. 3, 2016.
Notice of Allowance dated Nov. 28, 2018, U.S. Appl. No. 15/284,506, filed Oct. 3, 2016.
Notice of Allowance dated Mar. 11, 2019, U.S. Appl. No. 15/686,312, filed Aug. 8, 2017.
Network Functions Virtualisation, "An Introduction, Benefits, Enablers, Challenges Call for Action," Oct. 22-24, 2012, "SDN an OpenFlow World Congress," Darmstadt-Germany.
Network Functions Virtualisation, "Network Operator Perspectives on Industry Progress," Oct. 14-17, 2012, "SDN an OpenFlow World Congress," Darmstadt-Germany.
Foreign Communication from a Related Counterpart—International Search Report and Written Opinion dated Oct. 21, 2016, filed on Aug. 11, 2016, International Application No. PCT/US2016/046648.
Foreign Communication from a Related Counterpart, Preliminary Report on Patentability, dated Apr. 19, 2018, Application No. PCT/US2016/046648, filed on Aug. 11, 2016.
Hwang, Jinho, et al., entitled, "NetVM: High Performance and Flexible Networking Using Virtualization on Commodity Platforms," 11th USENIX Symposium on Networked Systems Design and Implementation (NSDI 14); Apr. 2-5, 2014, Seattle WA, US, ISBN 978-1-931971-09-06.
Mahy, et al., entitled, "Traversal Using Relays around NAT (TURN): Relay Extensions to Session Traversal Utilities for NAT (STUN)," Apr. 2010, Internet Engineering Task Force (IETF), Request for Comments: 5766. (Year: 2010).
Marquardt, Ronald R., et al., "Securing Communication in a Network Function Virtualization (NFV) Core Network," filed on Oct. 1, 2015, U.S. Appl. No. 14/872,936.
Paczkowski, Lyle W., et al., "Tiered Distributed Ledger Technology (DLT) in a Network Function Virtualization (NFV) Core Network," filed on Aug. 25, 2017, U.S. Appl. No. 15/686,312.
Paczkowski, Lyle W., et al., "Tiered Distributed Ledger Technology (DLT) in a Network Function Virtualization (NFV) Core Network," filed on May 20, 2019, U.S. Appl. No. 16/417,612.

\* cited by examiner

SESSION AGGREGATOR BROKERING OF DATA STREAM COMMUNICATION

CROSS-REFERENCE TO RELATED APPLICATIONS

This application is a divisional of and claims priority under 35 U.S.C. § 119 to U.S. patent application Ser. No. 15/284,506 filed on Oct. 3, 2016, entitled "Session Aggregator Brokering of Data Stream Communication," by Mark R. Bales, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol label switching (MPLS) is a technology that may be used to provide a variety of different communication services, for example virtual private network (VPN) links. MPLS can statically configure routes in a data communication network to provide greater speed in routing data packets, because the routing of the packet is performed based on labels (forward equivalence class (FEC) labels) in the packet header rather than based on executing routing algorithms.

SUMMARY

In an embodiment, a method of providing secure streamed data sessions over the Internet is disclosed. The method comprises collecting data communication performance metrics on a plurality of routers in the Internet by an orchestrator virtualized network function (VNF), where the orchestrator VNF is provided by execution on a virtual computing platform, receiving a request for a secure streamed data session by the orchestrator from a customer premises equipment (CPE) node, where the request identifies a service level agreement (SLA) to be supported by the secure streamed data session, and analyzing the metrics on the routing hosts by the orchestrator VNF based on the SLA identification in the request. The method further comprises determining a secure routing path for the requested secure streamed data session by the orchestrator VNF based on the analyzing, creating a routing instruction set that defines the secure routing path by the orchestrator VNF, and transmitting the routing instruction set to a session aggregator node by the orchestrator VNF. The method further comprises establishing trusted end-to-end communication links between the session aggregator node and each of the CPE node, a first edge router, a second edge router, and at least one of the plurality of routers by the session aggregator node, wherein applications engaged in the trusted end-to-end communication link with the session aggregator node execute in a trusted security zone and configuring the routing instruction set into each of the first edge router, the second edge router, and the at least one router by the session aggregator node via the trusted end-to-end communication link, wherein a secure streamed data session is dynamically defined and initiated.

In another embodiment, a method of providing streamed data sessions over the Internet is disclosed. The method comprises collecting a set of data communication performance metrics at a first time by an orchestrator virtualized network function (VNF) on a first plurality of routers associated with a first data network service provider and on a second plurality of routers associated with a second data network service provider, where the first data network service provider is different from the second data network service provider, where the orchestrator VNF is provided by execution on a virtual computing platform, receiving a request for a streamed data session by the orchestrator VNF from a customer premises equipment (CPE) node, where the request identifies a service level agreement (SLA) to be supported by the streamed data session, and analyzing the set of metrics based on the SLA identification in the request. The method further comprises determining a first routing path in a first data network associated with the first plurality of routers and the CPE node by the orchestrator VNF based on the analyzing, creating by the orchestrator VNF a first routing instruction set that defines the first routing path, determining a second routing path in a second data network associated with the second plurality of routers by the orchestrator VNF based on the analyzing, and creating by the orchestrator VNF a second routing instruction set that defines the second routing path. The method further comprises transmitting the first routing instruction set by the orchestrator VNF to a first session aggregator node associated with the first data network, configuring at least some of the first plurality of routers by the first session aggregator node in accordance with the first routing instruction set, transmitting the second routing instruction set by the orchestrator VNF to a second session aggregator node associated with the second data network, and configuring at least some of the second plurality of routers by the second session aggregator node in accordance with the second routing instruction set, wherein a streamed data session is dynamically defined and initiated that crosses two different data networks without the use of network-to-network interface (NNI) between the two different data networks.

In yet another embodiment, a system for proving secure streamed data sessions over the Internet is disclosed. The system comprises a first computer system providing a virtual computing platform in which it executes an orchestrator virtualized network function (VNF). The orchestrator VNF collects data communication performance metrics on a plurality of routers in the Internet, receives a request for a secure streamed data session from a customer premises equipment (CPE) node, where the request identifies a service level agreement (SLA) to be supported by the secure streamed data session, analyzes the metrics on the routing hosts based on the SLA identification in the request, determines a secure routing path for the requested secure streamed data session based on the analyzing, creates a routing instruction set that defines the secure routing path, and transmits the routing instruction set to a session aggregator application. The system further comprises a second computer system that executes the session aggregator application in a trusted security zone of the second computer system. The session aggregator establishes trusted end-to-end communication links with the CPE node, a first edge router, a second edge router, and at least one of the plurality of routers, wherein applications engaged in the trusted end-to-end communication link with the session aggregator node execute in a trusted security zone and configures the routing instruction set into each of the first edge router, the second edge router, and the at least one router via the trusted end-to-end communication link, wherein a secure streamed data session is dynamically defined and initiated.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
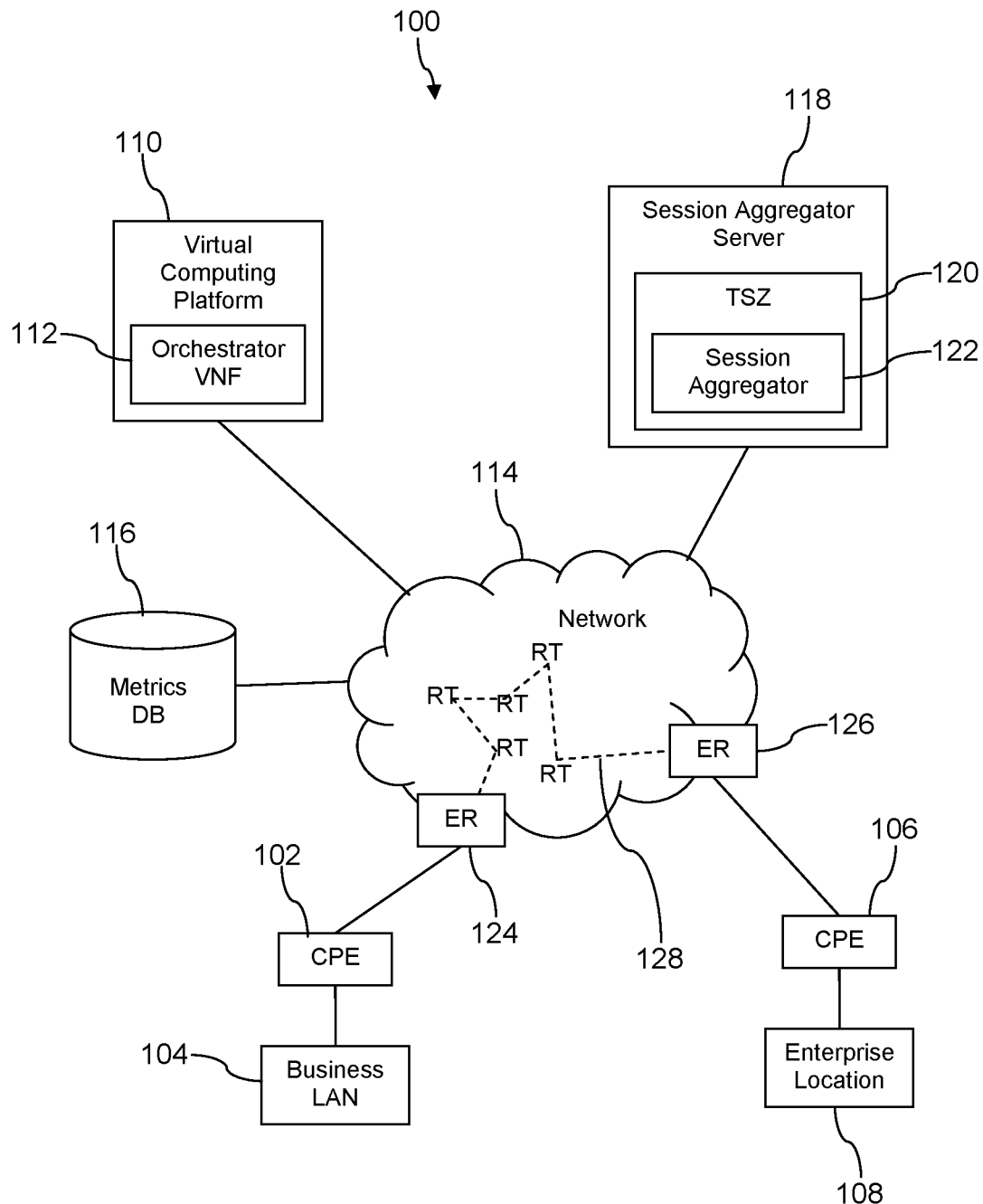
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In some telecommunication environments multiprotocol label switching (MPLS) is used to provide a variety of communication services. A disadvantage of MPLS may be that it is statically configured (e.g., it is configured by a craft person using a provisioning application executing on a host computer in a telecommunications service provider infrastructure in response to a telecommunications service customer request) and that it is delivered as a proprietary service over communication links that are under control of the telecommunications service provider. Because it is delivered as a proprietary service, MPLS typically is more expensive than equivalent bandwidth delivered "over-the-top" via the open Internet. While MPLS is relatively secure, "over-the-top" open Internet communication is inherently unsecure. The present disclosure teaches a system that overcomes the shortcomings of each of these alternative approaches and provides a secure "over-the-top" communication technology capable of supporting a plurality of desired telecommunication services.

In an embodiment, an orchestrator virtualized network function (VNF) receives current performance metrics from a plurality of data communication network hubs (e.g., edge routers and core routers) and analyzes the metrics to determine preferred routes across the communication network. When a customer premises equipment (CPE) requests a data communication stream to one or more end points, the orchestrator VNF determines what route can meet the service level agreement (SLA) defined in the request. The orchestrator VNF then builds routing instruction sets that are suitable for configuring the edge routers and core routers that make up the subject route. The orchestrator VNF transmits the routing instruction sets to a session aggregator server.

The session aggregator server first establishes trusted end-to-end communication links to each of the involved edge routers and core routers. Then the session aggregator sends the appropriate routing instruction set to each of the involved edge routers and core routers, whereby those edge routers and core routers adapt their internal routing tables to carry the data traffic from the requesting CPE to the one or more end points identified in the data communication stream request. It is understood that the end points may be other CPEs. As an example, the requesting CPE may be associated with a business local area network (LAN) and the end point CPE may be associated with an enterprise location or an enterprise data center. The communication may be a data stream such as a plurality of data packets that pass over the communication link or some other extended data communication session. The communication link may provide various data communication services such as virtual private networks (VPNs). The session aggregator server may further provide other configuration of the edge routers and core routers, for example configuring them to handle the subject data communication stream (i.e., the content of communication, the bearer traffic) using trusted end-to-end communication links. For further information on trusted end-to-end communication links, see U.S. Pat. No. 9,282,898 issued Mar. 15, 2016, entitled "End-to-end Trusted Communications Infrastructure," by Leo Michael McRoberts, et al., which is incorporated by reference herein in its entirety.

The system described above can provide flexible and cost effective communication over the top, via the open Internet. SLAs can be supported because the orchestrator VNF can adapt the configured route as performance metrics change over time. For example, if a portion of the Internet comprising one or more of the core routers involved in a data session route becomes over loaded and performance metrics worsen, the orchestrator can build one or more new routing instruction sets, send these to the session aggregator, and the session aggregator can send these to the involved routers to reconfigure the data session communication link. It should be noted that the use of the open Internet to provide the communication links does not necessarily mean the communication path is insecure. For example, open Internet routers that support trusted end-to-end communications links, such as routers that comprise a trusted security zone and routing software that may optionally execute in the trusted security zone, may provide secure communication services.

In an embodiment, the system described above can provide over-the-top communication service across a plurality of different telecommunications service provider networks without the use of network-to-network interfaces (NNIs) between the different provider networks. SLAs are difficult to guarantee over NNIs, due to practical business considerations. In the present disclosure, the SLAs are maintained by dynamically configuring the routing path, as described above, to use a route that is currently known to support the requested SLA. In the case of a plurality of provider networks, the orchestrator collects performance metrics from core routers and edge routers in all involved provider networks and sends appropriate routing instruction sets to an aggregator server in each of the involved provider networks.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications relying upon trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete trusted execution environment (TEE) may be implemented through the use of the trusted security zone hardware and software architecture. The trusted execution environment is an execution environment that is parallel to the execution environment of the main mobile device operating system. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile access terminals and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the mobile device users. For security purposes, the trusted security zone is not open to users for installing applications, which means that users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile access terminal so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which are permitted to execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a first communication system 100 is described. In an embodiment, first system 100 comprises a first customer premises equipment (CPE) 102 that provides data communication session connectivity from a business local area network (LAN) 104 or other computing devices to an enterprise location 108 via a network 114 and via a second CPE 106. It is understood that the first CPE 102 may provide communication connectivity to a plurality of CPEs 106 in a point-to-multipoint way. While in FIG. 1 the first CPE 102 is shown providing data communication session connectivity to a business LAN 104, it is understood that a variety of data communication devices may be served by the first CPE 102. Likewise, while in FIG. 1 the second CPE 106 is shown providing data communication session connectivity to an enterprise location 108, it is understood that a variety of data communication devices may be served by the second CPE 106. Also, while the data communication session is described as from the first CPE 102 to the second CPE 106, data communications may move in both directions, hence also from the second CPE 106 to the first CPE 102. The network 114 may comprise one or more private networks, one or more public networks, or a combination thereof. At least a portion of the network 114 may comprise the public Internet. In an embodiment, the network 114 may comprise a data communication network infrastructure managed and controlled by a single telecommunications service provider.

The system 100 further comprises a virtual computing platform 110 that executes an orchestrator virtual network function (VNF) 112. The virtual computing platform 110 may be implemented with a virtual computing paradigm. The orchestrator VNF 112 may be implemented as a virtual network function, for example as a factored plurality of network sub-functions that may be piped one to another to compose the complete desired orchestrator network function from a plurality of sub-functional components each executing on a virtual computing resource or computer system. The sub-functional components may be employed by other, different network functions and composed with other sub-functional components to compose those other different network functions. For further details on virtual network functions see U.S. Pat. No. 9,578,664, filed Feb. 21, 2017, entitled "Trusted Signaling in 3GPP Interfaces in a Network Function Virtualization Wireless Communication System," by Lyle W. Paczkowski, et al., which is incorporated herein by reference in its entirety.

The orchestrator VNF 112 analyzes performance metrics stored in a performance metrics data store 116. The performance metrics relate to performance of components of the network 114, for example core routers and edge routers 124, 126. Alternatively, in an embodiment, the performance metrics do not comprise performance metrics of the edge routers 124, 126. The performance metrics may indicate data throughput rates, jitter, latency, packet loss rates, quality of service (QoS), and other performance characteristics. The performance metrics may be date and time stamped, and the orchestrator VNF 112 may analyze only metrics that are current, for example only metrics that have a date and time stamp within a window of time extending from the present to a threshold length of time in the past. This time window may be 1 day in duration, 1 hour in duration, 10 minutes in duration, or some other duration in time. Based on analyzing the performance metrics and based on a request received by the orchestrator VNF 112 for a data communication session from the first CPE 102 to the second CPE 106, for example, the orchestrator VNF 112 builds router instruction sets that may be transmitted to a session aggregator server 118 to configure a data communication session between the first CPE 102 and the second CPE 106. The data communication session may be referred to as a data communication stream in some contexts.

The session aggregator server 118 may comprise a trusted security zone (TSZ) 120 that may be used to execute at least portions of a session aggregator application 122. The session aggregator application 122 may establish trusted end-to-end communication links with a first edge router 124, with a second edge router 126, and with a plurality of core routers (indicated in FIG. 1 in the interior of the cloud figure by CRT) in the network 114. The session aggregator application 122 sends an appropriate router instruction set, received from the orchestrator VNF 112, to each of the involved edge routers 124, 126 and core routers over the trusted end-to-end communication links. By sending the router instruction sets via trusted end-to-end communication links, this signaling and control function is made secure and less vulnerable to fraud or intrusion.

Each of the involved edge routers 124, 126 and core routers adapt their routing tables based on the routing instruction set that they receive from the session aggregator server 118. These routing instruction sets establish a route from the first CPE 102 to the second CPE 106 over a preferred route 128 identified by the orchestrator VNF 112. The orchestrator VNF 112 defines this preferred route 128 by creating the routing instruction sets. The preferred route 128 is expected to support a service level agreement (SLA) requested in the request for a data communication session sent by the CPE 102 to the orchestrator VNF 112. The SLA may be specified to the CPE 102 by a client such as an IT workstation on the business LAN 104. Supporting the SLA may involve providing a data communication session or data communication stream that consistently and reliably delivers a quality of service (QoS) that is needed to achieve a desired communication purpose. Supporting the SLA may comprise achieving a jitter below a predefined threshold, a latency below a predefined threshold, a packet error rate below a predefined threshold, a throughput rate above a predefined threshold, and the like.

Supporting the SLA may also comprise conducting the data communication session itself, not just the signaling to set the session up, over a trusted end-to-end communication link: from the first CPE 102 to the first edge router 124 through each of the core routers in the preferred route 128 to the second edge router 124 and to the second CPE 106. This may occur, for example, when the request from the CPE 102 specifies a request for a secure streamed data session. When the data communication session itself is performed over a trusted end-to-end communication link, the preferred route 128 and the edge routers 124, 126 may be referred to as a secure routing path.

The orchestrator VNF 112 continues to evaluate the performance metrics stored in the metrics data store 116 and adapts the routing instruction sets over time. Said in other words, the orchestrator VNF 112 may occasionally send out new routing instruction sets to the session aggregator application 122 which in turn sends these to the involved edge routers 124, 126 and core routers to adjust the preferred path 128 as desired to maintain the requested SLA in the request for a data communication session provided by the first CPE 102. This adjustment may comprise adding greater bandwidth or throughput to the preferred path 128 as data communication volume increases. This adjustment may comprise reducing bandwidth or throughput rate from the preferred path 128 as data communication volume decreases. In an embodiment, for example, a requested SLA may specify that the preferred path 128 maintain 50% excess capacity on average. If the data communication session starts to consume 70% of available bandwidth of the preferred path 128, leaving only 30% excess capacity, the orchestrator VNF 112 can adjust this by sending out, via the session aggregator application 122, new routing instruction sets whereby bandwidth of the data communication session or data communication stream is rescaled to 140% of the former bandwidth, thereby restoring the 50% excess capacity.

It is understood the data communication session described herein is not equivalent to a TCP connection or TCP session. The data communication session described herein may endure for a longer period of time, for example over a duration of time in which multiple TCP sessions are initiated, conducted, and completed, one after the other, on the data communication session. Additionally, the data communication session described herein may comprise a plurality of concurrent TCP sessions taking place over the data communication session over the preferred route 128. The data communication session may be referred to as a streamed data session. The communication over the data communication session may be conducted according to other protocols such as UDP or other protocols.

Figure 2:
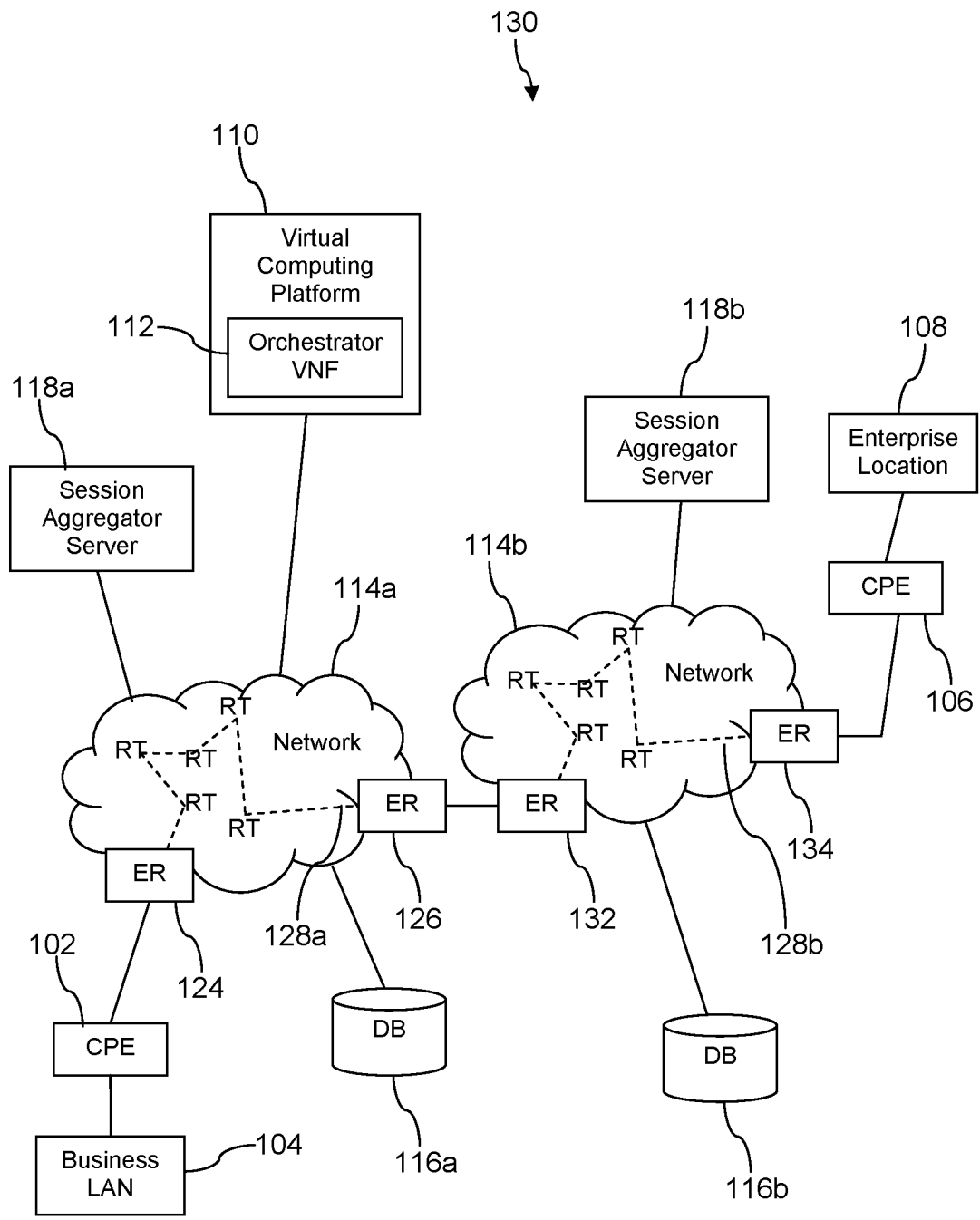
FIG. 2 is a block diagram of another communication system according to an embodiment of the disclosure.

Turning now to FIG. 2, a second communication system 130 is described. The system 130 shares a number of features and aspects of the first communication system 100. The principle difference between the systems 100, 130 is that the data communication session and the preferred route 128a/128b in FIG. 2 extends across two networks 114a/114b that are maintained by different telecommunication service providers. A first network 114a is maintained and controlled by a first telecommunications service provider. A first session aggregator server 118a and a first performance metrics data store 116a are associated with the first network 114a. The performance metrics stored in the first performance metrics data store 116a are associated with the edge routers 124, 126 and core routers of the first network 114a (alternatively, the first performance metrics data store 116a may store metrics only on the core routers of the first network 114a and not on the edge routers 124, 126). A second network 114b is maintained and controlled by a second telecommunications service provider. A second session aggregator server 118b and a second performance metrics data store 116b are associated with the second network 114b. The performance metrics stored in the second performance metrics data store 116b are associated with the edge routers 132, 134 and the core routers of the second network 114b (alternatively, the second performance metrics data store 116b may store metrics only on the core routers of the second network 114b and not on the edge routers 132, 134).

In some systems, to achieve predictable, reliable data communications service across two or more networks, a network-to-network interface (NNI) might be established between each network. But such NNIs are not guarantors of QoS or SLAs, and in practice it is often unfeasible to arrange and enforce such QoS or SLAs across NNIs. According to the present disclosure, no attempt is made to negotiate or enforce QoS or SLAs across network boundaries. Instead the preferred route 128a/128b is adapted over time by the orchestrator VNF 112 based on performance metrics (i.e., metrics data store 116a and metrics data store 116b) of involved edge routers and core routers in each network 114a/114b and through the session aggregators 118a/118b to achieve the desired QoS or SLAs. If the performance in either preferred route 128a or 128b degrades, the subject preferred route 128a/128b is adapted to restore the desired QoS or SLA. While two different networks 114a and 114b are illustrated in FIG. 2, it is understood that the teachings of the present disclosure are applicable for establishing data communication sessions over three or more different networks each operated by different telecommunications service providers.

Figure 3A:
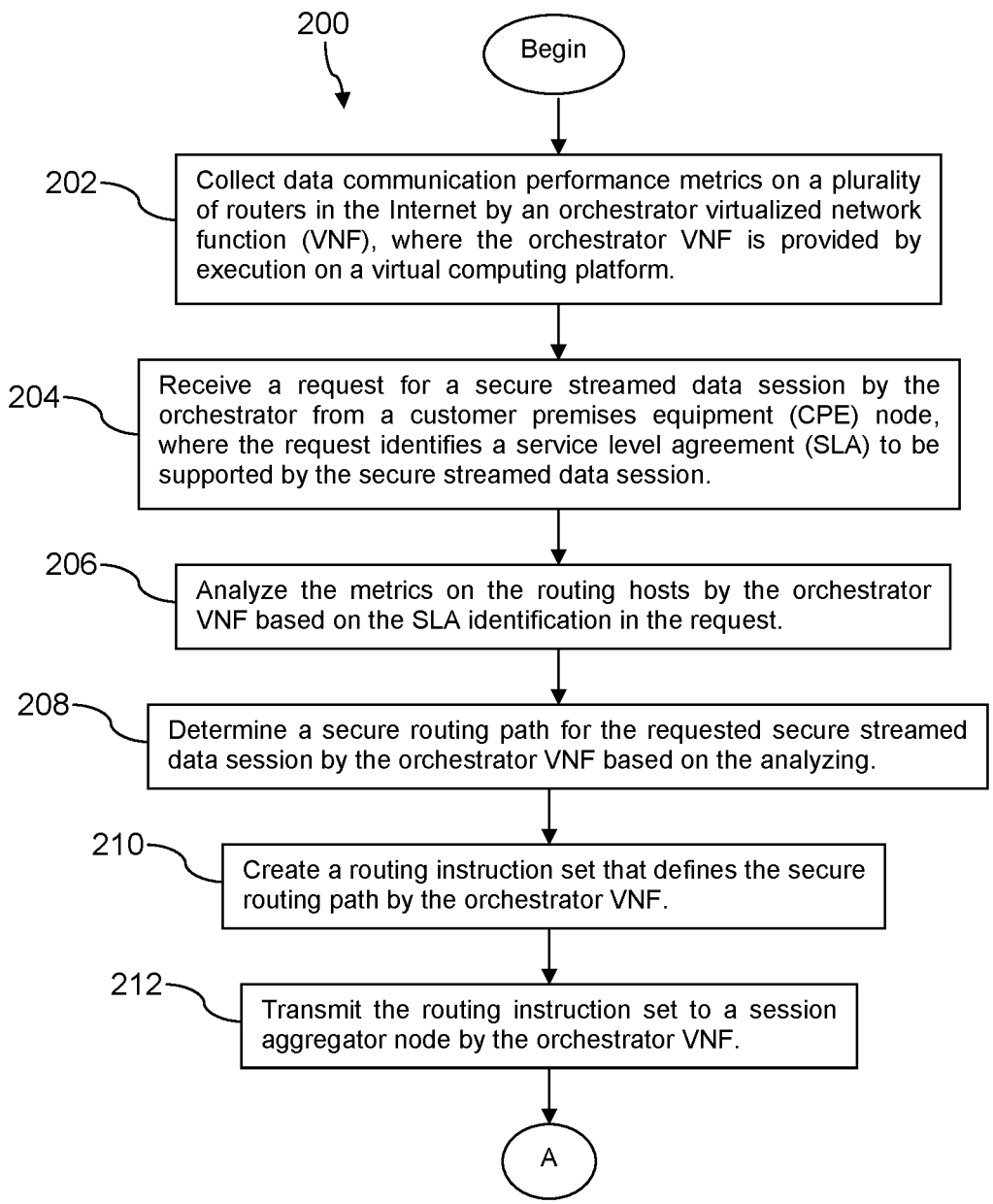
FIG. 3A and FIG. 3B are a flow chart of a method according to an embodiment of the disclosure.
Figure 3B:
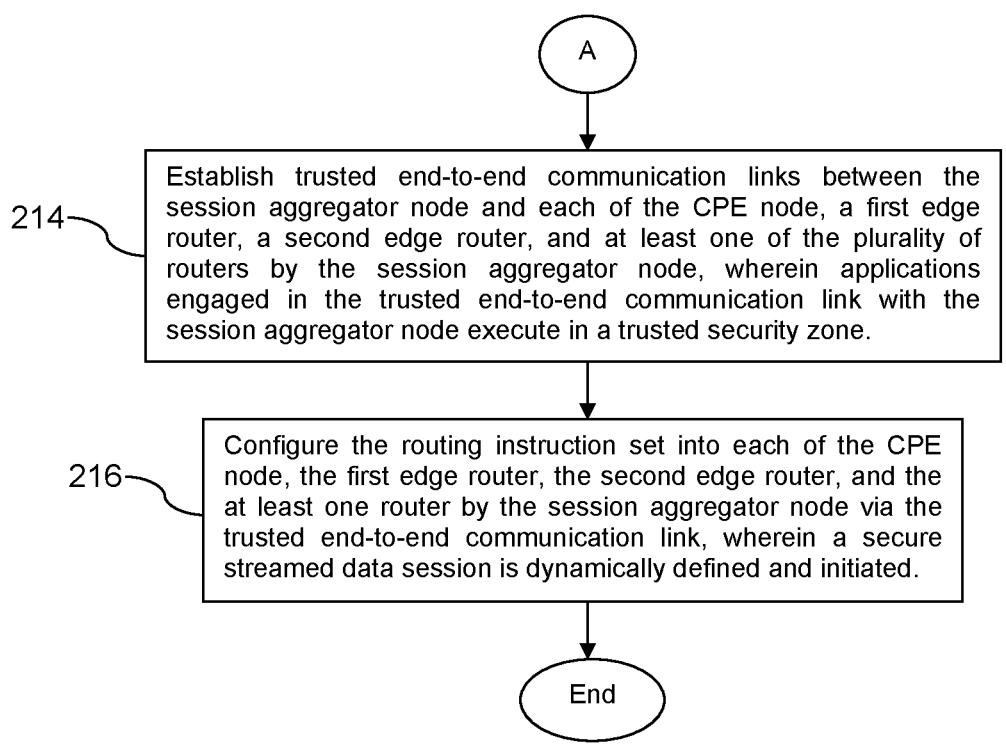

Turning now to FIG. 3A and FIG. 3B, a method 200 is described. At block 202, an orchestrator virtualized network function (VNF) collects data communication performance metrics on a plurality of routers in the Internet, where the orchestrator VNF is provided by execution on a virtual computing platform. At block 204, the orchestrator VNF receives a request for a secure streamed data session from a customer premises equipment (CPE) node, where the request identifies a service level agreement (SLA) to be supported by the secure streamed data session. At block 206, the orchestrator VNF analyzes the metrics on the routing hosts based on the SLA identification in the request.

Figure 4A:
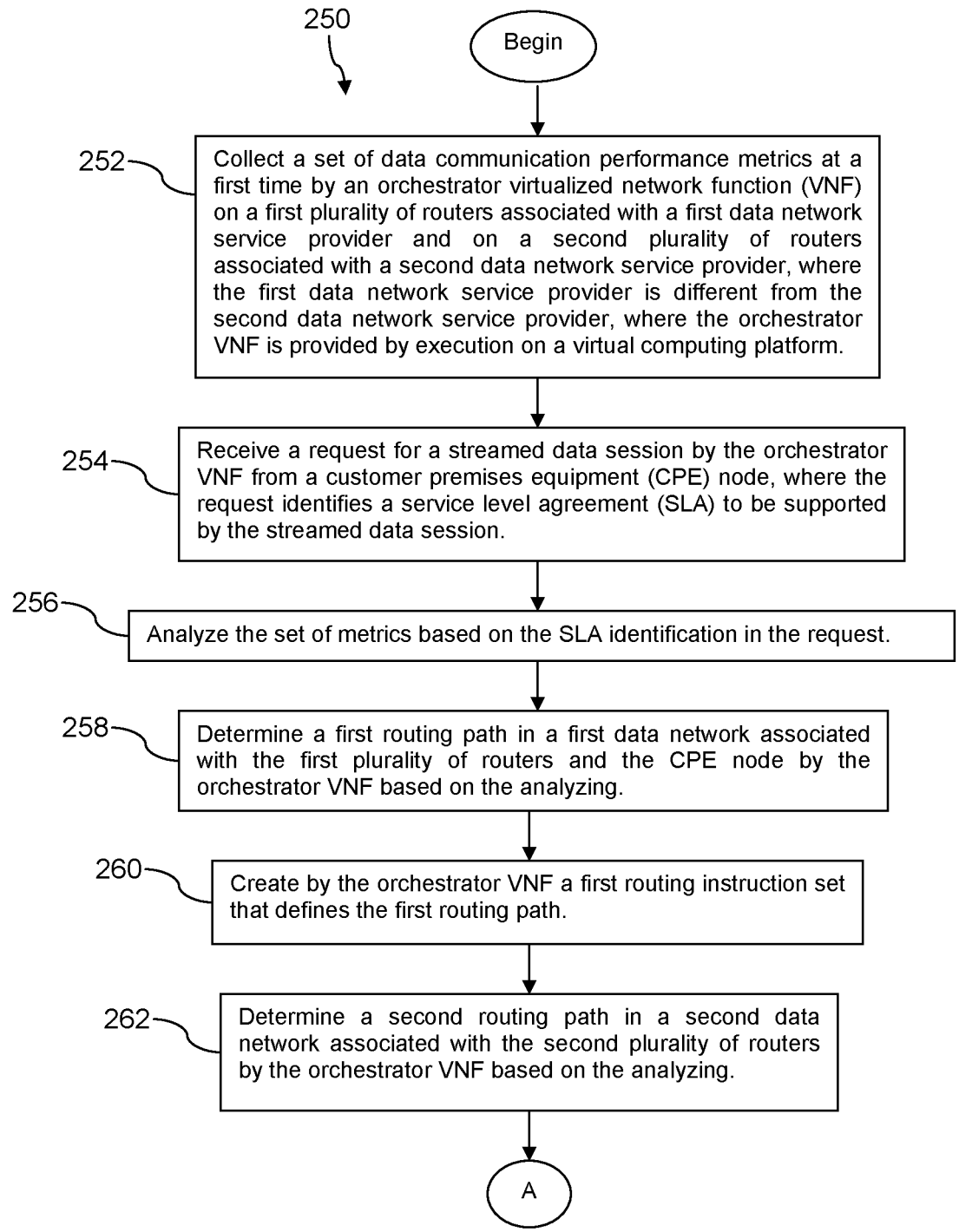
FIG. 4A and FIG. 4B are a flow chart of another method according to an embodiment of the disclosure.
Figure 4B:
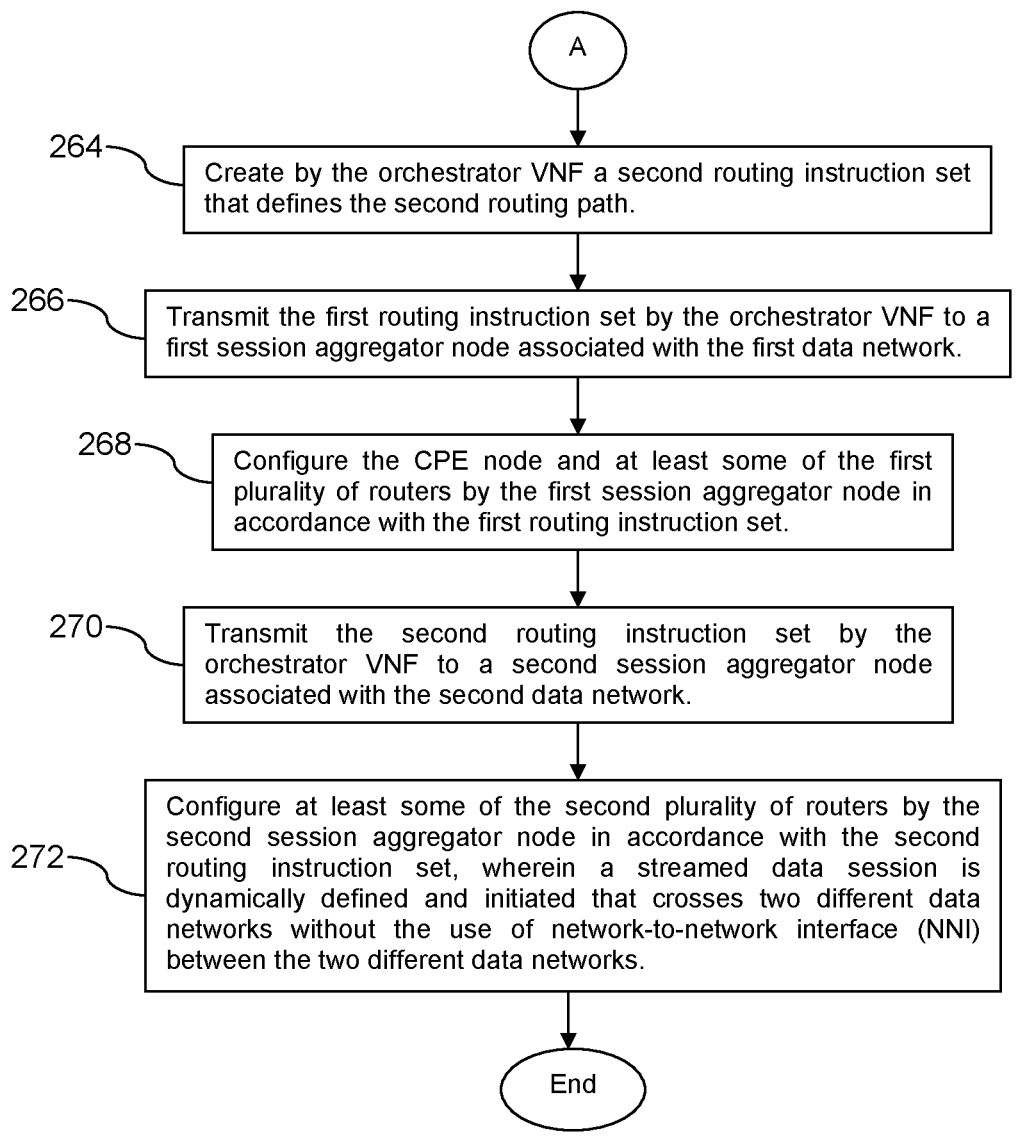

At block 208, the orchestrator VNF determines a secure routing path for the requested secure streamed data session based on the analyzing. In an embodiment, the orchestrator VNF determines the secure routing path at least in part based on using an application layer traffic optimizer (ALTO) algorithm. At block 210, the orchestrator VNF creates a routing instruction set that defines the secure routing path. At block 212, the orchestrator VNF transmits the routing instruction set to a session aggregator node. At block 214, the session aggregator node establishes trusted end-to-end communication links between the session aggregator node and each of the CPE node, a first edge router, a second edge router, and at least one of the plurality of routers, wherein applications engaged in the trusted end-to-end communication link with the session aggregator node execute in a trusted security zone. At block 216, the session aggregator node configures the routing instruction set into each of the CPE node, the first edge router, the second edge router, and the at least one router via the trusted end-to-end communication link, wherein a secure streamed data session is dynamically defined and initiated Turning now to FIG. 4A and FIG. 4B, a method 250 is described. At block 252, an orchestrator virtualized network function (VNF) collects a first set of data communication performance metrics at a first time on a first plurality of routers associated with a first data network service provider and on a second plurality of routers associated with a second data network service provider, where the first data network service provider is different from the second data network service provider, where the orchestrator VNF is provided by execution on a virtual computing platform. At block 254, the orchestrator VNF receives a request for a streamed data session from a customer premises equipment (CPE) node, where the request identifies a service level agreement (SLA) to be supported by the streamed data session. At block 256, the orchestrator VNF analyzes the first set of metrics based on the SLA identification in the request.

Figure 5:
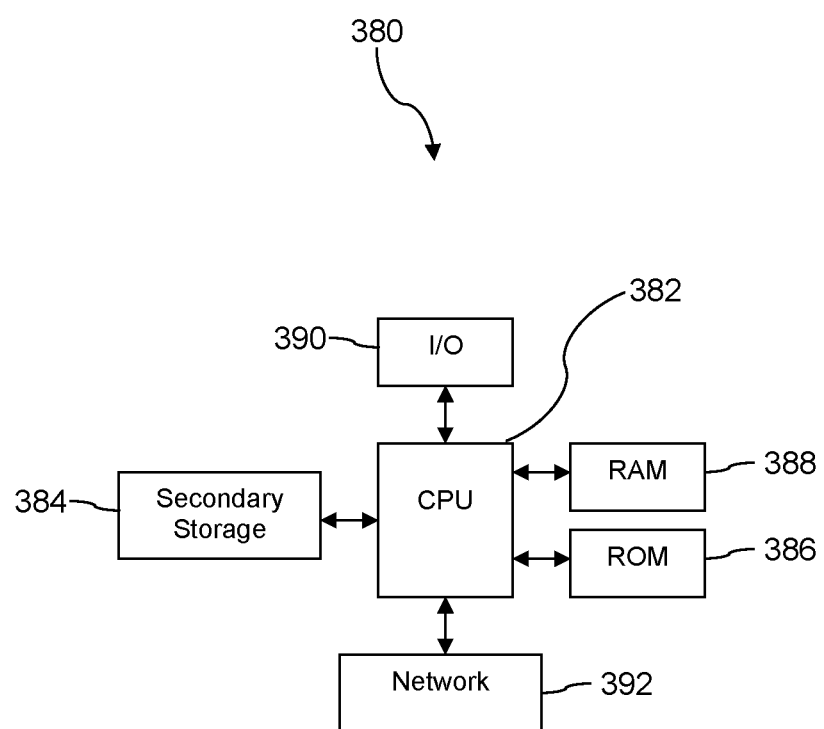
FIG. 5 is a block diagram of an exemplary computer system according to an embodiment of the disclosure.

At block 258, the orchestrator VNF determines a first routing path in a first data network associated with the first plurality of routers and the CPE node based on the analyzing. In an embodiment, the orchestrator VNF determines the first routing path at least in part based on using an application layer traffic optimizer (ALTO) algorithm. At block 260, the orchestrator VNF creates a first routing instruction set that defines the first routing path. At block 262, the orchestrator VNF determines a second routing path in a second data network associated with the second plurality of routers based on the analyzing. In an embodiment, the orchestrator VNF determines the second routing path at least in part based on using the application layer traffic optimizer (ALTO) algorithm. At block 264, the orchestrator VNF creates a second routing instruction set that defines the second routing path. At block 266, the orchestrator VNF transmits the first routing instruction set to a first session aggregator node associated with the first data network. At block 268, the first session aggregator node configures the CPE node and at least some of the first plurality of routers in accordance with the first routing instruction set. At block 270, the orchestrator VNF transmits the second routing instruction set to a second session aggregator node associated with the second data network. At block 272, the second session aggregator node configures at least some of the second plurality of routers in accordance with the second routing instruction set, wherein a streamed data session is dynamically defined and initiated that crosses two different data networks without the use of network-to-network interface (NNI) between the two different data networks FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing streamed data sessions over the Internet, comprising:
collecting a set of data communication performance metrics at a first time by an orchestrator virtualized network function (VNF) on a first plurality of routers associated with a first data network service provider and on a second plurality of routers associated with a second data network service provider, where the first data network service provider is different from the second data network service provider, where the orchestrator VNF is provided by execution on a virtual computing platform;
receiving a request for a streamed data session by the orchestrator VNF from a customer premises equipment (CPE) node, where the request identifies a service level agreement (SLA) to be supported by the streamed data session;

analyzing the set of data communication performance metrics based on the SLA identification in the request;

determining a first routing path in a first data network associated with the first plurality of routers and the CPE node by the orchestrator VNF based on the analyzing;

creating by the orchestrator VNF a first routing instruction set that defines the first routing path;

determining a second routing path in a second data network associated with the second plurality of routers by the orchestrator VNF based on the analyzing;

creating by the orchestrator VNF a second routing instruction set that defines the second routing path;

transmitting the first routing instruction set by the orchestrator VNF to a first session aggregator node associated with the first data network;

configuring at least some of the first plurality of routers by the first session aggregator node in accordance with the first routing instruction set;

transmitting the second routing instruction set by the orchestrator VNF to a second session aggregator node associated with the second data network; and configuring at least some of the second plurality of routers by the second session aggregator node in accordance with the second routing instruction set, wherein the streamed data session is dynamically defined and initiated that crosses two different data networks without the use of a network-to-network interface (NNI) between the two different data networks.

2. The method of claim 1, wherein determining the first routing path based on the analyzing comprises using an application layer traffic optimizer (ALTO) algorithm.

3. The method of claim 1, wherein the CPE node couples a business local area network to the streamed data session.

4. The method of claim 3, wherein the streamed data session couples the CPE node to an enterprise location.

5. The method of claim 3, wherein the streamed data session couples the CPE node to a data center.

6. The method of claim 1, wherein collecting the set of data communication performance metrics comprises collection metrics that are less than a threshold time duration old.

7. The method of claim 6, wherein the collection metrics are less than one day old.

8. The method of claim 6, wherein the collection metrics are less than one hour old.

9. The method of claim 1, further comprising:
creating by the orchestrator VNF a different routing instruction set;
transmitting by the orchestrator VNF the different routing instruction set to the first session aggregator node; and
configuring at least some of the first plurality of routers by the first session aggregator node in accordance with the different routing instruction set, wherein a throughput capacity of the streamed data session is expanded by configuring the different routing instruction set into at least some of the first plurality of routers.

10. The method of claim 9, wherein the orchestrator VNF is triggered to create the different routing instruction set by analyzing updated metrics on the first plurality of routers and determining that additional throughput capacity is needed to meet the SLA associated with the streamed data session.

11. The method of claim 1, further comprising:

creating by the orchestrator VNF a different routing instruction set;
transmitting by the orchestrator VNF the different routing instruction set to the first session aggregator node; and
configuring at least some of the first plurality of routers by the first session aggregator node in accordance with the different routing instruction set, wherein a throughput capacity of the streamed data session is reduced by configuring the different routing instruction set into at least some of the first plurality of routers.

12. The method of claim 11, wherein the orchestrator VNF is triggered to create the different routing instruction set by analyzing updated metrics on the first plurality of routers and determining that reduced throughput capacity is sufficient to meet the SLA associated with the streamed data session.

13. The method of claim 1, further comprising:
creating by the orchestrator VNF a different routing instruction set;
transmitting by the orchestrator VNF the different routing instruction set to the second session aggregator node; and
configuring at least some of the second plurality of routers by the second session aggregator node in accordance with the different routing instruction set, wherein a throughput capacity of the streamed data session is expanded by configuring the different routing instruction set into at least some of the second plurality of routers.

14. The method of claim 13, wherein the orchestrator VNF is triggered to create the different routing instruction set by analyzing updated metrics on the second plurality of routers and determining that additional throughput capacity is needed to meet the SLA associated with the streamed data session.

15. The method of claim 1, further comprising:
creating by the orchestrator VNF a different routing instruction set;
transmitting by the orchestrator VNF the different routing instruction set to the second session aggregator node; and
configuring at least some of the second plurality of routers by the second session aggregator node in accordance with the different routing instruction set, wherein a throughput capacity of the streamed data session is reduced by configuring the different routing instruction set into at least some of the second plurality of routers.

16. The method of claim 15, wherein the orchestrator VNF is triggered to create the different routing instruction set by analyzing updated metrics on the second plurality of routers and determining that reduced throughput capacity is sufficient to meet the SLA associated with the streamed data session.

17. The method of claim 1, wherein the set of data communication performance metrics comprises a jitter metric.

18. The method of claim 1, wherein the set of data communication performance metrics comprises a latency metric.

19. The method of claim 18, wherein the latency metric is provided by the CPE node.

20. The method of claim 1, wherein at least one of the first plurality of routers or the second plurality of routers comprises a plurality of edge routers and a plurality of core routers.

* * * * *